No. 744,648. PATENTED NOV. 17, 1903.
A. TYLER.
PINDAL PLANTER.
APPLICATION FILED JULY 2, 1903.
NO MODEL. 2 SHEETS—SHEET 1.
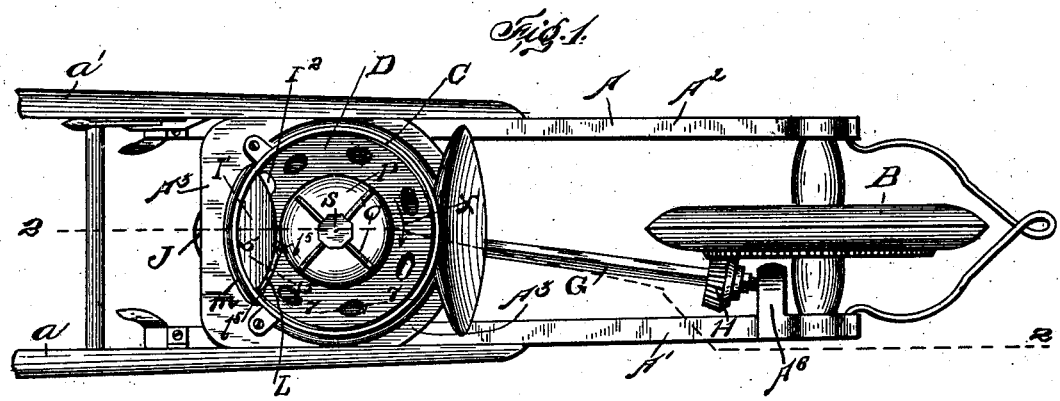
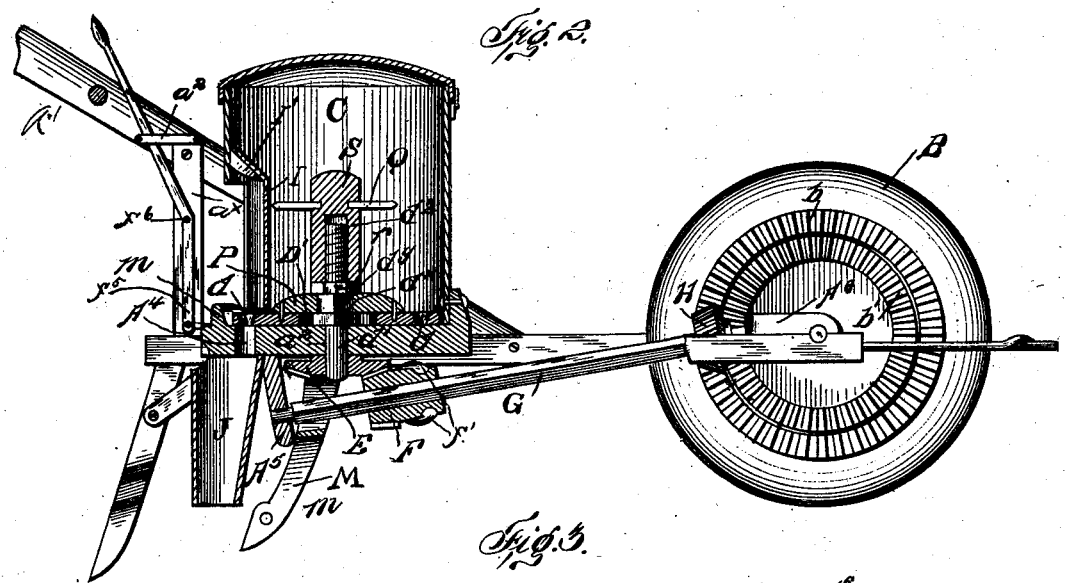
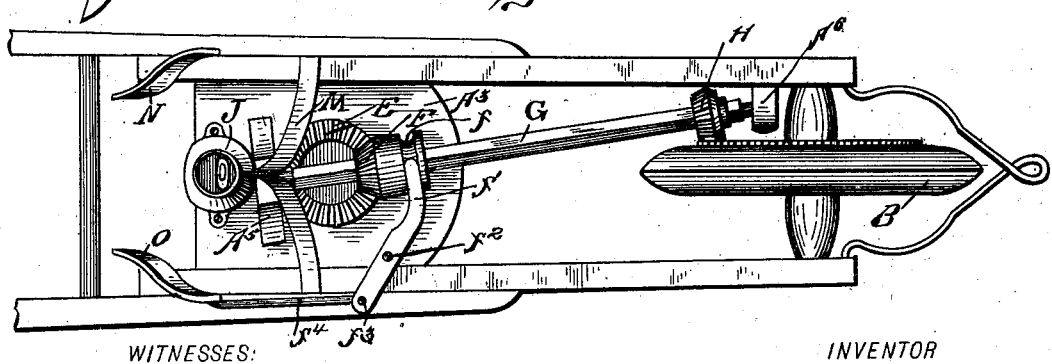
WITNESSES:
INVENTOR
Allen Tyler
BY Munn & Co.
ATTORNEYS.

No. 744,648. PATENTED NOV. 17, 1903.
A. TYLER.
PINDAL PLANTER.
APPLICATION FILED JULY 2, 1903.
NO MODEL. 2 SHEETS—SHEET 2.
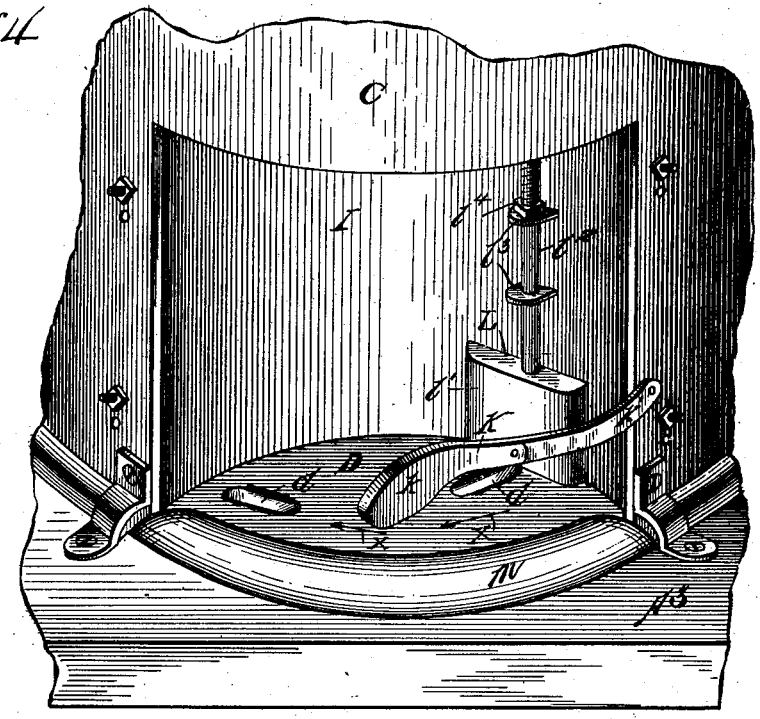
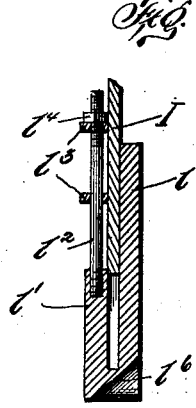
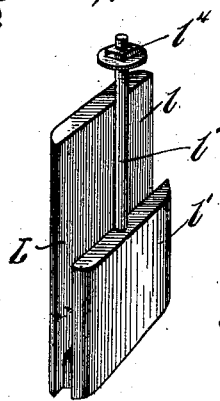
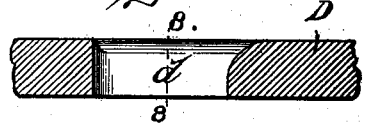
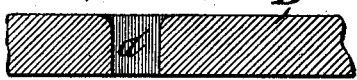
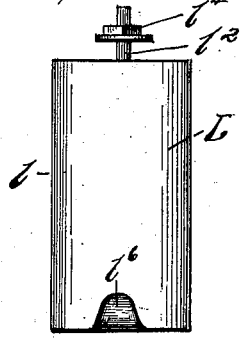
WITNESSES:
INVENTOR
Allen Tyler.
BY Munn & Co.
ATTORNEYS.

No. 744,648. Patented November 17, 1903.

UNITED STATES PATENT OFFICE.

ALLEN TYLER, OF QUITMAN, GEORGIA, ASSIGNOR OF ONE-HALF TO LEWIS T. CREECH, OF QUITMAN, GEORGIA.

PINDAL-PLANTER.

SPECIFICATION forming part of Letters Patent No. 744,648, dated November 17, 1903.

Application filed July 2, 1903. Serial No. 164,062. (No model.)

*To all whom it may concern:*

Be it known that I, ALLEN TYLER, a citizen of the United States, and a resident of Quitman, in the county of Brooks and State of Georgia, have made certain new and useful Improvements in Pindal-Planters, of which the following is a specification.

My object is to provide a machine of simple and durable construction which while especially adapted for planting the pindal or peanut will reliably deposit in the ground all kinds of seeds and the like ordinarily planted in hills separated a predetermined distance from each other.

My invention consists of certain novel features of construction and arrangement which will now be fully described and claimed, reference being had to the accompanying drawings, in which—

Figure 1 is a top plan view of my planter with the lid of the seed-receptacle open. Fig. 2 is a vertical section of my device, taken on the line 2 2 of Fig. 1, with the lid of the seed-receptacle closed. Fig. 3 is a bottom plan view. Fig. 4 is a detail perspective view showing the construction and arrangement of certain parts at the rear end of the seed-receptacle. Fig. 5 is a sectional view of the auxiliary gate, taken on line 5 5 of Fig. 1. Fig. 6 is a perspective view of the auxiliary gate removed from its connections. Fig. 7 is a partial section of the revolving feed-disk, showing the formation of the feed-openings at their ends, the section being taken on line 7 7 of Fig. 1. Fig. 8 is a similar view showing the formation of the sides of the feed-openings on about line 8 8 of Fig. 7, and Fig. 9 is an elevation of the inner side of the auxiliary gate.

Referring to the drawings, A designates the frame of my planter, which is substantially of ordinary construction, having the handles $a$ and $a'$ at the rear end thereof and the double-beveled furrow-opening wheel B journaled at the front end. The bed-plate $A^3$ is located at the rear end of the frame and serves to unite the side bars $A'$ and $A^2$ of the frame in rigid engagement with each other.

The seed-receptacle C is suitably mounted and secured upon the bed-plate $A^3$.

The revolving feed-disk D rests upon the bed-plate $A^3$ within the seed-receptacle and practically forms the bottom of said receptacle. This disk carries at its center the rigid journal $d'$, extending downwardly through a bore $a^2$ in the bed-plate, which bore forms a bearing therefor. This journal $d'$ has an enlarged flattened portion $d^x$, which rests upon the bed-plate $A^3$ immediately above the opening $a^2$ therein, and the revolving feed-disk is provided with an enlarged central opening $D'$, surrounding this flattened portion, which is of a thickness equal to the thickness of the feed-disk. Immediately above the flattened portion $d^x$ the journal $d'$ is provided with an enlarged squared portion $d^y$, upon which is received the superimposed disk P, said disk having a central square aperture adapted to fit said squared portion of the journal, whereby when the journal $d'$ is revolved the superimposed disk is also revolved. Now this superimposed disk P is secured near its periphery by suitable attaching devices to the feed-disk D, so that when it is revolved it carries the feed-disk with it. The upper end of the journal $d'$ is screw-threaded and has a nut $r$ screwed down upon the top of the superimposed disk to hold the same always upon the squared portion of said journal. To the threaded portion of this journal above the nut $r$ is secured the removable stirrer $d^2$, which is employed with my device when it is used as a cotton-seed planter.

Rigidly secured to the lower end of the journal $d'$ immediately underneath the bed-plate $A^3$ is the bevel cog-wheel E, which meshes with the wheel F, carried upon the shaft G. This shaft has bearing at its rear end in the depending bracket $A^5$, carried on the under side of the bed-plate $A^3$, and at its front end in the inwardly-extending bracket $A^6$ near the front end of the side bar $A'$ of the frame. The gear-wheel H is carried at the front end of the shaft G and is adapted to be longitudinally adjusted on said shaft to be brought into mesh with one or the other of the gear-wheels $b$ or $b'$, carried on the adjacent face of the double-beveled furrow-wheel B, according as it is desired to impart a greater or less rapid rotation to the shaft G. The double-beveled furrow-opening wheel B constitutes the driving-wheel of the planter and through the shaft G and connections revolves the gear-wheel F at the bottom of the said box or receptacle C.

The feed-disk D is provided near its periphery with a series of elongated concentric openings or seed-pockets $d$ equidistant from each other, and the bed-plate is provided near its rear end with a larger elongated opening $A^4$, with which the openings $d$ come into registration as the disk revolves.

The seed-receptacle has the lower portion of its rear wall removed, and the opening thus formed is closed with an inwardly-curved and vertically-adjustable gate I, (see Fig. 4,) the lower edge of which is just above the upper face of the feed-disk D. The gate I is provided on its inside with the finger-piece $I^2$ (see Fig. 1) for conveniently raising and lowering the same. The opening at the top of the gate caused by the inward curvature thereof is closed by the inclined section $I'$, secured to the upper edge of the gate and extending outwardly and upwardly therefrom into engagement with the wall of the seed-receptacle. (See Fig. 2.)

The inward curvature of the gate I forms a recess, as it were, at the rear lower side of the seed-receptacle, with the revolving feed-disk projecting underneath said gate into said recess, said projecting portion of the disk being always in full view of the operator. A segment of the circle in which the openings $d$ rotate passes through this recess, and the large opening $A^4$ in the bed-plate with which the openings $d$ successively come into registration is located underneath this recess central of said bed-plate.

The depending spout J is secured to the under side of the bed-plate with its upper end surrounding the opening $A^4$ and its lower end extending downwardly to the ground to positively direct to the furrow all seed that passes through said opening.

The gravity-ejector K, having the weighted end $k$ and the other end $k'$ suitably pivoted at its outer end to the wall of the seed-receptacle, operates within the recess at the rear of said receptacle. The weighted end $k$ of the feeder rests and rides upon the revolving feed-plate D immediately above the opening $A^4$ in the bed-plate, and as said feed-plate revolves the forward end $k$ of said weight successively drops into the openings $d$ in the feed-plate to forcibly remove therefrom, through the opening $A^4$, any seed that may perchance fail to readily pass through said openings $d$, the feed-plate revolving in the direction of the arrow $x$ in Figs. 1 and 4.

The gate I is provided with the auxiliary gate L, located at one side thereof immediately above the circular row of openings $d$. This gate is clearly illustrated in Figs. 4, 5, and 6 and comprises the inner and outer guide-sections $l$ and $l'$ integrally united at their lower ends, the former operating against the inner wall of the gate I and the latter against the outer wall thereof, said wall having a cut-away portion into which is received the lower central portion of the two sections $l$ and $l'$, said sections each having laterally-extending vertical flanges overlapping the side wall of said cut-away portion, said walls being easily received between said flanges. The outer guide-section $l'$ at the bottom of the auxiliary gate only extends upwardly to the top of the cut-away portion in the main gate I, but the inner section $l$ extends upwardly much farther. The vertical rod $l^2$ extends upwardly from the top of the guide-section $l'$ through suitable apertures in the guide-bracket $l^3$ and practically forms an extension of said section $l'$. The top of the rod $l^2$ is screw-threaded and provided with a nut $l^4$, which is adapted to rest upon the upper guide-bracket $l^3$ and forms means for the proper vertical adjustment of the auxiliary gate. The inner guide-section $l$ of the auxiliary gate is also provided at its sides with suitable guides $l^5$.

Special attention is called to the beveled recess $l^6$, located at the lower end on the inner side of the auxiliary gate, and also to the formation of the openings $d$ in the revolving feed-plate, which coöperate with said beveled recess, both of which constructions are important features of my invention.

From Figs. 7 and 8 it will be seen that with the feed-disk revolving in the direction of the arrow $x$ the openings $d$ are formed with their front end walls vertical from bottom to top, and with their rear end walls and side walls beveled at the top. The beveled sides and rear ends of these openings permits the peanuts to readily drop into the openings, while the front end of the openings will permit the weight $k$ to drop suddenly therein to promptly dislodge any pinder that may have possibly stuck in the opening.

The lower end of the gate I is sufficiently elevated above the revolving disk D to permit nuts of ordinary size to readily pass thereunder after they have fallen into the openings $d$, as will be understood from Fig. 2; but it is frequently the case that a nut of unusual size projects upwardly above the openings $d$, and if no other provision were made than the slight elevation of the gate I above the feed-disk D, already referred to, the end of the nut would be caught against the gate and crushed. To prevent this, the light auxiliary gate L is provided, and, having the beveled recess $l^6$, as already described, when a pindal of unusual size is borne along in one of the openings $d$ it strikes the beveled recess of the auxiliary gate, which enables the nut to easily elevate the gate and pass under without even cracking the shell. The gate is sufficiently heavy to instantly drop by gravity to its normal position.

The exposed portion of the revolving disk D at the rear of the seed-receptacle is surrounded by a curved upwardly-extending shield or flange $m$ upon the rear end of the bed-plate. This shield prevents small nuts which may occasionally be trailed out under the gates I or L from falling over the end of the bed-plate and being lost.

In addition to the double-beveled furrow-opening wheel B my planter is also provided with the plow M, which is suitably supported upon the frame of the planter underneath the bed-plate $A^3$ and runs immediately in front of the spout J to open the earth just as the seed is dropped. The rear ends of the side bars $A'$ and $A^2$ carry coverers N and O, which follow close after the spout J to cover the seed.

Since the openings $d$ are equidistant from each other, the seed will be planted in hills an equal distance apart, and the distance that the hills shall be apart is determined and regulated by putting the adjustable gear H at the forward end of the shaft G into mesh with the proper one of the wheels $b$ and $b'$ on the face of the disk plow B.

In turning corners it is desirable that the planter shall be thrown out of gear, and to effect this the gear F, meshing with the gear E to revolve the feed-disk, is mounted for longitudinal movement on the shaft G, being provided with the annular groove $f$, into which is received the inner ends of the bifurcated lever $f'$, pivoted at $f^2$ to the base-plate $A^3$ of the planter. When this lever is moved back and forth, it throws the wheel F into and out of mesh with the wheel E, and thereby stops the feed-disk without stopping the shaft G.

For the convenient operation and control of the lever $f'$ the outer end thereof is pivotally connected at $f^3$ by the rod $f^4$ with the lower end of the controlling-lever $f^5$, which is pivoted at $f^6$ to the brace $a^x$ of the handle $a'$ of the frame. The controlling-lever $f^5$ projects upwardly a short distance above the handle-bar $a'$ and is provided with a suitable guard $a^2$, carried by said handle-bar. This guard is provided on its inner face with an offset, as illustrated in Fig. 1. When the lever $f^5$ is pulled rearwardly, the wheel F is thrown in mesh with the wheel E and the machine is in gear and the offset referred to will hold said lever locked in the position just described till the same is manually removed therefrom. When the lever is moved forward, the wheel F is thrown out of mesh with the wheel E and the feed-disk is stopped.

The feed-disk D is provided at its center with the smaller disk P, having its upper face rounded to direct the seed toward the openings $d$ when the seed-receptacle C is nearly empty.

The seed-stirrer Q, extending upwardly from the center of the feed-disk, is employed with my device when it is used for planting cotton-seed. For planting peanuts, corn, peas, &c., the stirrer is not needed and may be removed.

From the foregoing description it becomes apparent that when my planter moves forward rotation is imparted by the disk or double-beveled furrow-opening wheel B to the feed-disk D at the botom of the seed-receptacle C. The seed in the openings $d$ of the feed-disk is carried out underneath the gate I into the recess at the rear of the feed-receptacle, and as each opening $d$ comes into registration with the larger opening $A^4$ in the bed-plate the seed usually falls therethrough by gravity and the weight $k$ also falls into the opening $d$ to force the seed downwardly through said opening $A^4$, provided it should fail to fall through by gravity, and the spout J conveys the seed from the opening $A^4$ to the center of the furrow.

The quantity of seed to be planted in a hill is regulated by the size of the openings $d$ in the feed-disk. Each disk may be provided with openings of different sizes for different kinds of seed, or there may be a separate disk for each kind of seed to be planted when the quantity to be planted of each is different.

Having thus described my planter, what I claim as new, and desire to secure by Letters Patent, is—

1. In a planter substantially as described, a bed-plate having a bore therein, a journal extending downwardly through said bore, a wheel secured to the lower end of said journal and in mesh with a driving-wheel, said journal having an enlarged flattened portion resting upon the top side of said bed-plate to limit the downward movement of said journal, a squared portion on said journal above said flattened portion and a threaded portion extending upwardly from immediately above said squared portion, a feed-disk resting upon the top side of said bed-plate and having an enlarged central opening surrounding said enlarged flattened portion of the journal, a superimposed disk rigidly secured to said feed-disk to revolve therewith and provided with a central square aperture snugly received upon said squared portion of the journal, a nut at the lower part of said threaded portion resting upon said superimposed disk, the threaded portion of the journal above said nut serving as a means of securing to the journal a stirrer when the device is used as a cotton-planter substantially as set forth.

2. A planter of the character described, comprising a frame, a double-beveled furrow-wheel, at the forward end thereof, provided with driving cog-gears on its face, a bed-plate at the rear end of the frame, a circular seed-receptacle mounted on said bed-plate and having a reëntrant wall at its rear side, a revolving feed-disk mounted upon said bed-plate within said receptacle forming a bottom therefor, a portion of said disk extending outwardly underneath said reëntrant wall, said feed-disk also having a row of concentric seed-pockets revolving from within the seed-receptacle outward underneath the reëntrant wall, said bed-plate having an opening near its rear end underneath the exposed part of the feed-disk and in the path of said feed-pockets, a pivoted ejector having a weighted end resting upon the exposed part of the feed-disk immediately above the opening in the bed-plate and within the recess formed at the rear of the feed-receptacle by the reëntrant wall, said ejector being adapted to drop successively into the seed-pockets of the revolving disk as said pockets come into registration with said openings in the bed-plate, a vertically-movable gate carried by said wall above the circle of revolution of the seed-pockets in the feed-disk, said gate being provided at its lower inner side immediately above the row of seed-pockets with a bevel recess facing downwardly and inwardly, gear connections between the double-beveled furrow-opening wheel and the revolving feed-disk, manual connections under the control of the operator for engaging and disengaging said gear connections with said feed-disk, a spout extending downwardly from said opening in the bed-plate to the furrow, a plow carried by the planter and extending downwardly immediately in front of the seed-spout and independent thereof, and coverers carried by the frame of the planter at the rear of the seed-spout at each side thereof for covering the seed.

3. In a planter of the character described, a frame, a base-plate carried by the frame, a seed-receptacle mounted upon said base-plate, a revolving feed-disk upon said base-plate within said receptacle and forming a bottom for the receptacle and provided with a circular row of seed-pockets, said receptacle having an opening at its rear lower portion, a vertically-adjustable gate closing said opening above the feed-disk and curved inwardly forming a reëntrant wall at that portion of the seed-receptacle, thereby throwing a portion of said revolving disk without said seed-receptacle, said bed-plate having an opening underneath the exposed part of the disk and above which the seed-pockets of the feed-disk pass to deliver their contents through said opening to the furrow, an ejector pivoted to the seed-receptacle and having a free weighted end resting upon the feed-disk immediately above the opening in the bed-plate to drop into the seed-pockets to dislodge seed therefrom as they successively register with said opening, said reëntrant gate having a cut-away portion in its exit side above the line of revolution of the seed-pockets to permit the passage of a peanut projecting perchance above the face of the feed-disk, and an adjustable and vertically-movable auxiliary gate held by the main gate in said cut-away portion, said auxiliary gate having its lower end provided with a bevel facing downwardly and inwardly.

4. In a planter of the character described, a frame, a seed-receptacle mounted upon said frame, a revolving feed-disk at the bottom of said receptacle rotating partly within and partly without said receptacle, said disk having concentric seed-pockets, alternately passing first within and then without the receptacle by the revolution of the disk, an ejector resting upon the disk and adapted to successively drop into said pockets as the disk revolves, and a gate at the outlet side of said wall above the circle of revolution of the seed-pockets, said gate having that portion of its inner lower edge immediately above the row of seed-pockets provided with a bevel recess facing inwardly and downwardly.

5. In a planter, a seed-receptacle, a rotating feed-disk in said receptacle at the bottom thereof, said disk having concentric seed-pockets, a reëntrant wall at one side of said receptacle above said feed-disk, said wall extending inwardly across the circle in which the seed-pockets revolve, and a vertically-operating gate in said wall, said gate being provided on its lower end with a broad face adapted to rest upon the feed-disk, and extending across said circle in an approximately radial direction, said gate also having on its lower end within said broad face immediately above the circle of seed-pockets, a beveled recess facing inwardly and downwardly for the purpose specified.

6. The combination of the seed-receptacle, having an opening in one side thereof, the seed-disk operating partly within and partly without said box, and a gravity-gate closing said opening and sliding relatively to the seed-disk, said gate having inner and outer plates engaging the walls of the receptacle at the sides and top of said opening, rigid apertured projections extending outwardly from the wall of the receptacle above the outer plate of said gate, a rigidly-secured rod extending upwardly from said outer plate and passing loosely through said projections, and adjustable means on said rod for engaging one of said projections to adjustably support said gate.

ALLEN TYLER.

Witnesses:
A. J. CONOT,
W. H. HARDEN.